(12) United States Patent
Zhang et al.

(10) Patent No.: US 11,544,496 B2
(45) Date of Patent: Jan. 3, 2023

(54) METHOD FOR OPTIMIZING IMAGE CLASSIFICATION MODEL, AND TERMINAL AND STORAGE MEDIUM THEREOF

(71) Applicant: BEIJING DAJIA INTERNET INFORMATION TECHNOLOGY CO., LTD., Beijing (CN)

(72) Inventors: Zhiwei Zhang, Beijing (CN); Fan Yang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 184 days.

(21) Appl. No.: 17/040,924

(22) PCT Filed: Dec. 20, 2018

(86) PCT No.: PCT/CN2018/122441
§ 371 (c)(1),
(2) Date: Sep. 23, 2020

(87) PCT Pub. No.: WO2019/179189
PCT Pub. Date: Sep. 26, 2019

(65) Prior Publication Data
US 2021/0374470 A1   Dec. 2, 2021

(30) Foreign Application Priority Data

Mar. 23, 2018 (CN) .......................... 201810246754.3

(51) Int. Cl.
*G06K 9/62* (2022.01)
*G06V 10/20* (2022.01)
(Continued)

(52) U.S. Cl.
CPC ........... *G06K 9/6256* (2013.01); *G06K 9/627* (2013.01); *G06K 9/6255* (2013.01);
(Continued)

(58) Field of Classification Search
None
See application file for complete search history.

(56) References Cited

U.S. PATENT DOCUMENTS

2009/0240637 A1\*  9/2009  Drissi .................. G06F 16/353
706/12

FOREIGN PATENT DOCUMENTS

| CN | 104951802 A | 9/2015 |
| CN | 105320957 A | 2/2016 |
| | (Continued) | |

OTHER PUBLICATIONS

International Search Report and Written Opinion of corresponding PCT Application No. PCT/CN2018/122441—16 pages (dated Mar. 20, 2019).

(Continued)

*Primary Examiner* — David Perlman
(74) *Attorney, Agent, or Firm* — Knobbe, Martens, Olson & Bear, LLP

(57) ABSTRACT

A method for optimizing an image classification model can include determining a first image classification model based on initial training data; in response to model optimization, determining a second image classification model based on the first image classification model and a noise data set; and obtaining a third image classification model by optimizing the second image classification model based on the initial training data, the third image classification model being configured to update the noise data set based on noise data generated within a predetermined time period and the noise data set.

19 Claims, 5 Drawing Sheets

(51) Int. Cl.
*G06V 10/30* (2022.01)
*G06V 10/70* (2022.01)
*G06N 20/00* (2019.01)

(52) U.S. Cl.
CPC ......... *G06K 9/6262* (2013.01); *G06K 9/6277* (2013.01); *G06K 9/6288* (2013.01); *G06V 10/20* (2022.01); *G06V 10/30* (2022.01); *G06V 10/70* (2022.01); *G06N 20/00* (2019.01)

(56) References Cited

FOREIGN PATENT DOCUMENTS

| CN | 105550295 A | 5/2016 |
| CN | 106503617 A | 3/2017 |
| CN | 107305636 A | 10/2017 |
| CN | 107341523 A | 11/2017 |
| CN | 108614858 A | 10/2018 |

OTHER PUBLICATIONS

First Office Action of corresponding Chinese Application No. 201810246754.3—9 pages (dated Mar. 29, 2019).
Notification to Grant Patent Right for Invention of corresponding Chinese application No. 201810246754.3—3 pages (Jun. 3, 2019).
Peng, "Image classification model based on feature selection and clustering analysis", Modem Electronics Technique, vol. 40, No. 19—12 pages (Oct. 31, 2017).
Wang et al., "Image Classification Model Using Unsupervised Learning Algorithm and Convolution", Journal of Huaqiao University ( Natural Science), vol. 39, No. 1—14 pages (Jan. 31, 2018).

* cited by examiner

METHOD FOR OPTIMIZING IMAGE CLASSIFICATION MODEL, AND TERMINAL AND STORAGE MEDIUM THEREOF

This application is a national phase application of International Application No. PCT/CN2018/122441, filed on Dec. 20, 2018, which claims priority to Chinese Patent Application No. 201810246754.3, filed on Mar. 23, 2018, in the China National Intellectual Property Administration, the disclosures of which are herein incorporated by reference in their entireties.

TECHNICAL FIELD

The present disclosure relates to the technical field of image classification model optimization, and more particularly, relates to a method for optimizing image classification model, and a terminal and a storage medium thereof.

BACKGROUND

Recently, the deep learning has made breakthrough progresses in such fields of content-related understandings as natural language processing and text translation. The progresses of the deep learning in the above fields depend mainly on the scale of training data of deep learning-based models. The training data is mainly intended to train models based on deep learning. Therefore, the scale of the training data is a challenge to apply relevant technologies in the fields of content-related understandings to actual production environments. Accordingly, how to reduce workload of annotating of the training data, and update the models is the concern in the industry.

SUMMARY

Embodiments of the present disclosure provide a method for optimizing an image classification model, and a terminal and a storage medium thereof.

According to an aspect of the present disclosure, a method for optimizing an image classification model is provided.

The method includes:

determining a first image classification model based on initial training data, the initial training data including at least one image with a manually annotated tag;

in response to model optimization, determining a second image classification model based on the first image classification model and a noise data set, the noise data set including a plurality of noise data;

obtaining a third image classification model by optimizing the second image classification model based on the initial training data, the third image classification model being configured to update the noise data set based on noise data generated within a predetermined time period and the noise data set, the predetermined time period including a time period between two adjacent model optimizations.

According to still another aspect, a terminal is provided. The terminal includes: a memory, a processor, and a computer program stored on the memory and runnable on the processor. The computer program, when run by the processor, enables the processor to perform the following steps:

determining a first image classification model based on initial training data, the initial training data including at least one image with a manually annotated tag;

in response to model optimization, determining a second image classification model based on the first image classification model and a noise data set, the noise data set including a plurality of noise data;

obtaining a third image classification model by optimizing the second image classification model based on the initial training data, the third image classification model being configured to update the noise data set based on noise data generated within a predetermined time period and the noise data set, the predetermined time period including a time period between two adjacent model optimizations.

According to still another aspect, a computer-readable storage medium is provided. A computer program is stored on the computer-readable storage medium. The computer program, when run by a processor, enables the processor to perform the following steps:

determining a first image classification model based on initial training data, the initial training data including at least one image with a manually annotated tag;

in response to model optimization, determining a second image classification model based on the first image classification model and a noise data set, the noise data set including a plurality of noise data;

obtaining a third image classification model by optimizing the second image classification model based on the initial training data, the third image classification model being configured to update the noise data set based on noise data generated within a predetermined time period and the noise data set, the predetermined time period including a time period between two adjacent model optimizations.

The above description is merely the summary of the technical solutions of the present disclosure. In order to understand the technical means of the present disclosure more clearly to implement the technical means according to the contents of the description, and to make the above and other purposes, features and advantages of the present disclosure more obvious and understandable, detailed descriptions of the present disclosure are listed below.

BRIEF DESCRIPTION OF THE DRAWINGS

Various advantages and benefits are readily apparent to those of ordinary skill in the art upon reading the following detailed description. The accompanying drawings only illustrate some embodiments but are not considered as a limit to the present disclosure. Throughout the accompanying drawings, the same reference symbol indicates the same component. In the drawings.

DETAILED DESCRIPTION

Figure 1:
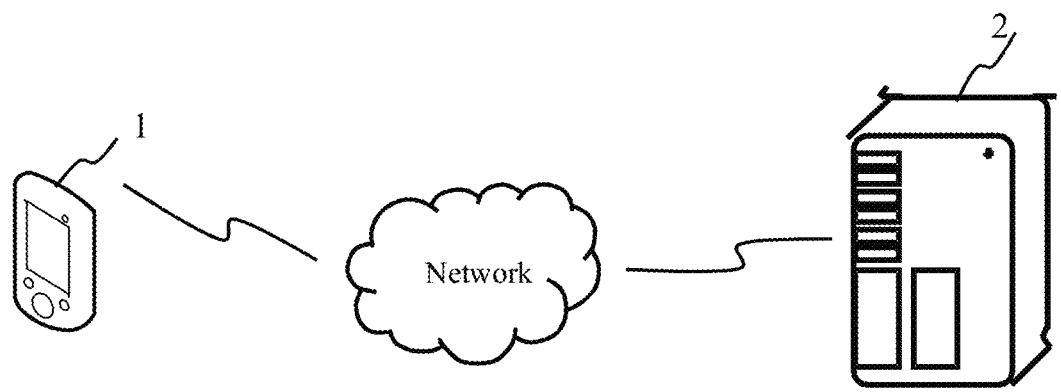
FIG. 1 is a schematic diagram of an implementation environment of a method for optimizing an image classification model according to an embodiment of the present disclosure.

The example embodiments of the present disclosure will be described in details hereafter with reference to the drawings. Although the example embodiments of the present disclosure are shown in the drawings, it should be understood that the present disclosure can be realized in various forms and shall not be limited to the embodiments elaborated herein. On the contrary, the embodiments are provided such that the present disclosure can be understood more thoroughly and the scope of the present disclosure can be completely conveyed to those skilled in the art.

FIG. 1 is a schematic diagram of an implementation environment of a method for optimizing an image classification model according to an embodiment of the present disclosure. Referring to FIG. 1, the implementation environment involves a terminal 1 and a server 2. The terminal 1 uploads noise data generated during operations of a user. The server 2 filters, according to a predetermined period, the noise data generated during history operations of the user, and sends the noise data upon the filtering to the terminal 1. The terminal 1 optimizes an image classification model based on the noise data.

The terminal 1 is any device capable of optimizing the image classification model. It should be noted that user information involved in the present disclosure is information authorized by the user or sufficiently authorized by various parties. In addition, the expression "A and/or B" covers three circumstances of A and B, single A, and single B.

Figure 2:
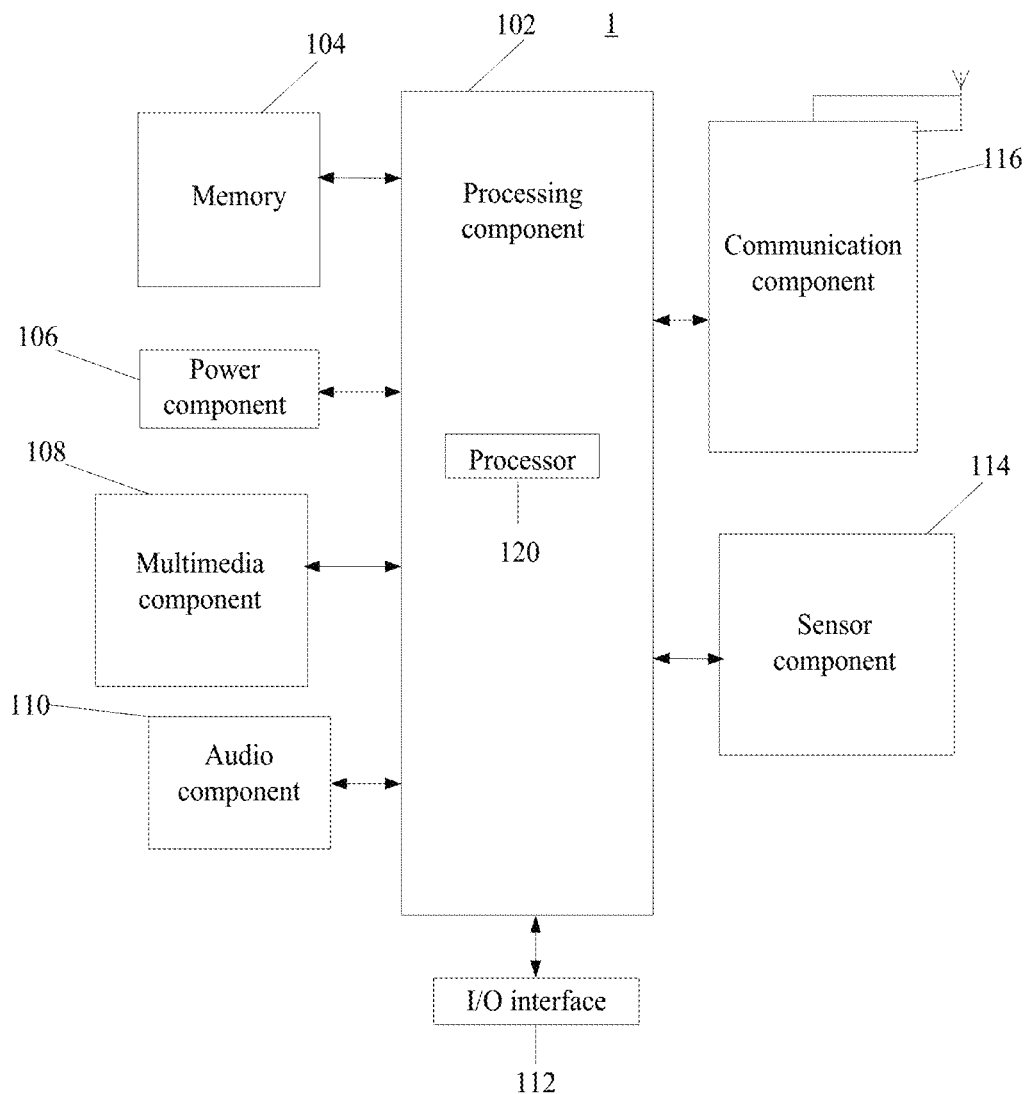
FIG. 2 is a schematic structural diagram of a terminal according to an embodiment of the present disclosure.

The terminal in the embodiment of the present disclosure may include: a memory, a processor, and a computer program stored on the memory and capable of running on the processor; and the computer program, when run by the processor, enables the processor to perform steps of any method for optimizing the image classification model in the present disclosure. FIG. 1 is a block diagram of a terminal according to an example embodiment. In some embodiments, the terminal 1 may be a mobile phone, a computer, a digital broadcast terminal, a messaging device, a gaming console, a tablet, a medical device, exercise equipment, a personal digital assistant (PDA), and the like Referring to FIG. 2, the terminal 1 may include one or more of: a processing component 102, a memory 104, a power component 106, a multimedia component 108, an audio component 110, an input/output (I/O) interface 112, a sensor component 114, and a communication component 116.

The processing component 102 typically controls overall operations of the terminal 1, such as the operations associated with display, telephone calls, data communications, camera operations, and recording operations. The processing component 102 may include one or more processors 120 to execute instructions to perform all or part of the steps in the above described methods. Moreover, the processing component 102 may include one or more modules which facilitate the interaction between the processing component 102 and other components. For instance, the processing component 102 may include a multimedia module to facilitate the interaction between the multimedia component 108 and the processing component 102.

The memory 104 is configured to store various types of data to support the operation of the terminal 1. Examples of such data include instructions for any application or method operated on the terminal 1, contact data, phonebook data, messages, pictures, videos, and the like. The memory 104 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 106 provides power to various components of the terminal 1. The power component 106 may include a power management system, one or more power sources, and any other components associated with the generation, management, and distribution of power in the terminal 1.

The multimedia component 108 includes a screen providing an output interface between the terminal 1 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 108 includes a front camera and/or a rear camera. The front camera and the rear camera may receive external multimedia data while the terminal 1 is in an operation mode, such as a photographing mode or a video mode. Each of the front camera and the rear camera may be a fixed optical lens system or have focus and optical zoom capability.

The audio component 110 is configured to output and/or input audio signals. For example, the audio component 110 includes a microphone (MIC) configured to receive an external audio signal when the terminal 1 is in an operation mode, such as a call mode, a recording mode, and a voice recognition mode. The received audio signal may further be stored in the memory 104 or transmitted via the communication component 116. In some embodiments, the audio component 110 further includes a speaker configured to output audio signals.

The I/O interface 112 provides an interface between the processing component 102 and peripheral interface modules. The peripheral interface modules may be a keyboard, a click wheel, buttons, and the like. The buttons may include, but are not limited to, a home button, a volume button, a starting button, and a locking button.

The sensor component 114 includes one or more sensors to provide status assessments of various aspects of the terminal 1. For instance, the sensor component 114 may detect an open/closed state of the terminal 1 and relative positioning of components. For example, the components are the display and the keypad of the terminal 1. The sensor component 114 may further detect a change in position of the terminal 1 or a component of the terminal 1, a presence or absence of user contact with the terminal 1, an orientation or an acceleration/deceleration of the terminal 1, and a change in temperature of the terminal 1. The sensor component 114 may include a proximity sensor, configured to detect the presence of nearby objects without any physical contact. The sensor component 114 may also include a light sensor, such as a complementary metal-oxide-semiconductor transistor (CMOS) or charge coupled device (CCD) image sensor, for use in imaging applications. In some embodiments, the sensor component 114 may also include an accelerometer sensor, a gyroscope sensor, a magnetic sensor, a pressure sensor, or a temperature sensor.

The communication component 116 is configured to facilitate communication, wired or wirelessly, between the terminal 1 and other devices. The terminal 1 may access a wireless network based on a communication standard, such as Wi-Fi, 2G, or 3G, or a combination thereof. In an example embodiment, the communication component 116 receives a broadcast signal or broadcast associated information from an external broadcast management system via a broadcast channel. In an example embodiment, the communication component 116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the terminal 1 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method for optimizing the image classification model.

In some embodiments, a non-temporary computer-readable storage medium including at least one instruction is further provided, for example, the memory 104 including the at least one instruction. The at least one instruction may be executed by the processor 120 of the terminal 1 to perform the above image filtering method. For example, the non-transitory computer-readable storage medium may be a read-only memory (ROM), a random-access memory (RAM), a compact disc read-only memory (CD-ROM), a magnetic tape, a floppy disc, an optical data storage device, and the like. The at least one instruction, when executed by the processor of the terminal, enables the terminal to perform steps of any method for optimizing the image classification model in the present disclosure.

In the terminal according to the embodiment of the present disclosure, the terminal determines a first image classification model based on initial training data, determines a second image classification model on noise data in a noise database and the first image classification model, and obtains a third image classification model by correcting (optimizing) the second image classification model based on the initial training data, filters, by using the third image classification model, the noise data in the noise database and noise data generated during two model optimizations, combines the filtered noise data, and replaces the noise data in the noise database with the combined noise data, thereby expanding the noise data database along with the media data generated in Internet, and optimizing the image classification model. In the terminal according to the embodiments of the present disclosure, the tagging of the user on massive training data turns out to be unnecessary, and only the first image classification model obtained by training with the initial training data is tagged manually; and in use, the first image classification model can be automatically optimized. Accordingly, the manpower resource can be saved, the timeliness for optimizing the image classification model can be ensured, and the decline in prediction ability of the image classification model is avoided.

In the embodiment of the present disclosure, the terminal acquires initial training data, and determines the first image classification model based on the initial training data, wherein the initial training data include images with manually annotated tags. The terminal optimizes the first image classification model at intervals of a predetermined time period. This optimization process is as follows: the terminal determines the second image classification model based on the first image classification model and a noise data set, wherein the noise data set includes a plurality of noise data, and obtains the third image classification model by optimizing the second image classification model based on the initial training data.

Upon obtaining the third image classification model, the terminal updates the noise data set by using the third image classification model based on the noise data generated during a predetermine time period and the noise data set, wherein the predetermined time period is a time period between two adjacent model optimizations.

Upon updating the noise data set, the terminal performs a next model optimization based on the noise data set. This process is as follows: the terminal determines the second image classification model based on the first image classification model and the noise data set, wherein the noise data set includes a plurality of noise data; and obtains the third image classification model by optimizing the second image classification model based on the initial training data.

Upon obtaining the third image classification model, the terminal then updates the noise data set, and sequentially perform model optimization and data set update.

Figure 3:
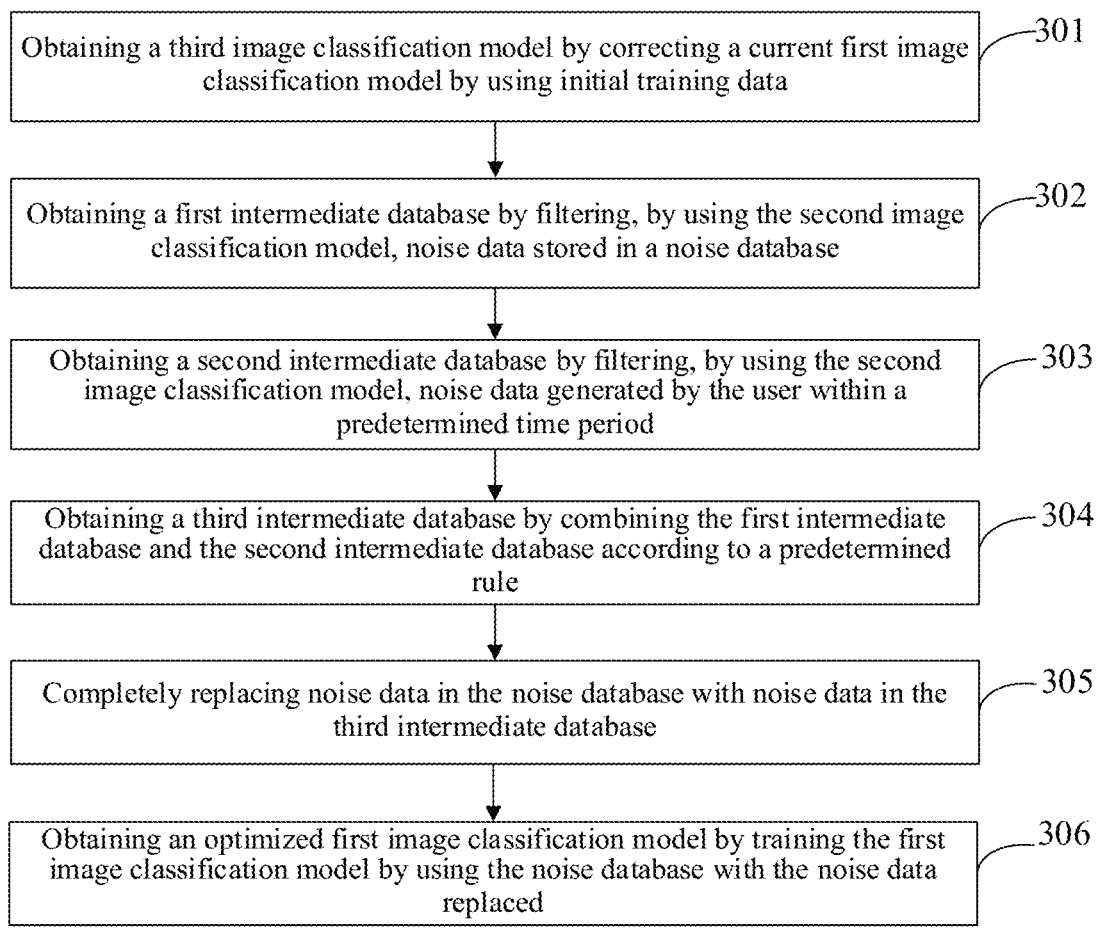
FIG. 3 is a flowchart of steps of a method for optimizing an image classification model according to an embodiment of the present disclosure.

Referring to FIG. 3, a flowchart of steps of a method for optimizing an image classification model according to an embodiment of the present disclosure is illustrated.

The method includes the following steps.

In step 301, a terminal obtains a third image classification model by correcting a current first image classification model by using initial training data.

In the embodiment of the present disclosure, the terminal pre-stores a trained first image classification model. The first image classification model is obtained by training using the initial training data. That is, prior to this step, the terminal determines the first image classification model based on the initial training data. The initial training data is data with a manually annotated tag. The data includes images. That is, the initial training data includes images with manually annotated tags.

The first image classification model includes a plurality of predetermined tags and initial training data corresponding to each of the predetermined tags. In use, the first image classification model is optimized (that is, corrected) according to a predetermined period, and the optimized first image classification model serves as an object to be optimized in the next time. That is, the first image classification model is optimized once within each predetermined time period.

The first classification model is trained based on noise data stored in a noise database. That is, the terminal first determines the first image classification model based on the initial training data, and then optimizes the first image classification model based on the noise data. For ease of differentiation, an image classification model obtained by training the first image classification image based on the noise data stored in the noise database is referred to as a second image classification model. In some embodiments, this process is as follows: the terminal determines the second image classification model based on the first image classification model and the noise database, wherein the noise database is any noise data set configured to store a plurality of noise data.

In some embodiments, the optimization performed by the terminal on the first image classification model is substantially optimization of the noise database. That is, upon determining the second image classification model, the terminal obtains the third image classification model by optimizing the second image classification model based on the initial training data. The third image classification model is configured to update the noise database based on the noise data generated during the predetermined time period and the noise database. Noise data that is historically generated by a user and is filtered is managed in the noise database.

That is, the second image classification model is obtained by training based on the noise data stored in the noise database. During the process that the terminal optimizes the second image classification model, the terminal obtains the third image classification model by optimization, and then optimizes the noise database based on the third image classification model. The noise data stored in the noise database may include: the noise data generated within the predetermined time period or the noise data that is generated within the predetermined time period and then filtered. The predetermined time period may be a time period between two model optimizations.

In the image classification model optimization according to the embodiment of the present disclosure, the massive noise data generated in history operations of the user and the noise data in the currently managed and maintained noise database are filtered, and the noise database is updated with the filtered noise data, thereby entering the optimization process for optimizing the first image classification model. In some embodiments, the predetermined period may be one day, two days or 12 h, which is not specifically displayed thereto in the embodiment of the present disclosure. The description is made to the single image classification model optimization process in the embodiment of the present disclosure. During specific implementation, for each subsequent image classification model optimization process, the process in the embodiment of the present disclosure may be performed.

In step 302, the terminal obtains a first intermediate database by filtering, by using the second image classification model, noise data stored in a noise database.

The first intermediate database is a first data set constituted by the noise data filtered from the noise database. In the embodiment of the present disclosure, by correcting the first image classification model by the terminal by using the initial model training data, the training accuracy for the image classification model can be improved.

The step that the terminal obtains the first intermediate database by filtering the noise data stored in the noise database includes: randomly selecting a plurality of sample data from the noise database; performing at least one transformation of rotation, translation and shearing on each of the sample data, and obtaining a data set by augmenting the sample data; and obtaining the first intermediate database by filtering data in the augmented data set by using a data distillation algorithm.

In some embodiments, the process that the terminal obtains the first intermediate database by filtering the noise data stored in the noise database is as follows: the terminal extracts a plurality of noise data from the noise database; obtains transformed data of each of the sample data by transforming the each of the sample data; adds the transformed data of the each of the sample data to the noise database; and obtaining the first intermediate database by filtering the noise database to which the transformed data is added. The sample data may be transformed by at least one of rotation, translation, and shearing.

In some embodiments, filtering the data in the noise database by using the data distillation algorithm is only an example. The filtering is performed not limited to using the data distillation algorithm. The terminal may filter the noise data stored in the noise database in any feasible filter manner, which is not limited in the embodiment of the present disclosure.

In step 303, the terminal obtains a second intermediate database by filtering, by using the second image classification model, noise data generated by the user within a predetermined time period.

The predetermined time period is a time period between two adjacent optimizations of the image classification model. During operations of the user, the terminal uploads the data, for example, an image, to a platform in real time. The data uploaded by the terminal to the platform is the noise data. A back-end server managing the platform filters, according to the predetermined period, the noise data generated in the history operations of the user. The predetermined period may be set by those skilled in the art according to an actual demand. The noise data generated by the operation of the user in the interval between two adjacent times of filtering is the noise data generated by the user within the predetermined time period. The terminal randomly extracts the sample data from the noise data generated by the user within the predetermined time period, and the amount of extracted sample data may have a magnitude of ten million or one hundred million. For example, the predetermined period is one day, and the amount of noise data generated by the user on the platform everyday reaches several billions. However, due to the limited capacity of the database, the terminal needs to extract hundreds of millions or tens of millions of images as the sample data, and discard the rest unextracted noise data.

The step that the terminal obtains the second intermediate database by filtering the noise data generated by the user within the predetermined time period is as follows: the terminal randomly selects a plurality of (more than one) noise data as the sample data; performs at least one transformation of rotation, translation, and shearing, and obtains a data set by augmenting the sample data; and obtains the second intermediate database by filtering data in the data set by using the data distillation algorithm.

In step 304, the terminal obtains a third intermediate database by combining the first intermediate database and the second intermediate database according to a predetermined rule.

The third intermediate database is a third data set obtained by combining the second intermediate database and the third intermediate database. The first intermediate database and the second intermediate database respectively include a plurality of noise data, and each of the noise data corresponds to a target tag and a target tag probability. When the terminal combines the first intermediate database and the second intermediate database, noise data in the two intermediate databases may be jointly grouped based on the target tags, and noise data in each group is filtered based on the target tag probabilities to obtain the third intermediate database.

The target tags corresponding to the noise data are the same or different. It may be understood that a corresponding relationship is present between the target tag and the target tag probability corresponding to each of the noise data.

In some embodiments, the terminal corrects tags of the filtered noise data in the third intermediate database to improve the accuracy of tag annotation. For the clarity of description, the tag correction process on the filtered noise data in the third intermediate database is subsequently described in detail.

It should be further noted that in addition to combining the first intermediate database and the second intermediate database by using the predetermined rule, the terminal may also achieve the combination in other ways. For example, the terminal directly combines the first intermediate database and the second intermediate database to obtain the third intermediate database.

In step 305, the terminal completely replaces noise data in the noise database with noise data in the third intermediate database.

In some embodiments, the terminal replaces the noise data in the noise database with the noise data in the third intermediate database; or the terminal replaces a part of images in the noise database with the noise data in the third intermediate noise database. In the embodiment of the present disclosure, the way of replacing a part of images in the noise database with the noise data in the third intermediate noise database is not limited.

In step 306, the terminal obtains an optimized first image classification model by training the first image classification model by using the noise database with the noise data replaced.

Upon this optimization, the first image classification model is actually the second image classification model. The noise data upon the replacement includes a plurality of noise data, and each of the noise data is annotated with a target tag thereof. In the embodiment of the present disclosure, the terminal periodically optimizes the first image classification model. Correspondingly, upon optimizing the first image classification model this time, the terminal optimizes the first image classification model again after one predetermined period; and the process goes back to step 301 to take the first image classification model optimized at the previous time as the current first image classification model, and the noise database optimized and replaced at the previous time as the current noise database. During training of the first image classification model by the terminal with the replaced noise database, the first image classification model is the above current first image classification model.

In the method for optimizing the image classification model according to the embodiment of the present disclosure, the terminal determines the first image classification model based on the initial training data, determines the second image classification model based on the noise data in the noise database and the first image classification model, obtains the third image classification by correcting (optimizing) the second image classification based on the initial training data, filters, by using the third image classification mode, the noise data in the noise database and the noise data generated by the user between two model optimizations, combines the filtered noise data, and replaces the noise data in the noise database with the combined noise data, thereby expanding the noise database along with the media data generated in Internet, and optimizing the image classification model. According to the method for optimizing the image classification model according to the embodiment of the present disclosure, the tagging of the user on massive training data turns out to be unnecessary, and only the first image classification model obtained by training with the initial training data is tagged manually; and in use, based on the method for optimizing the image classification model according to the embodiment of the present disclosure, the first image classification model can be automatically optimized. Accordingly, the manpower resource can be saved, the timeliness for optimizing the image classification model can be ensured, and the decline in prediction ability of the image classification model is avoided.

Figure 4:
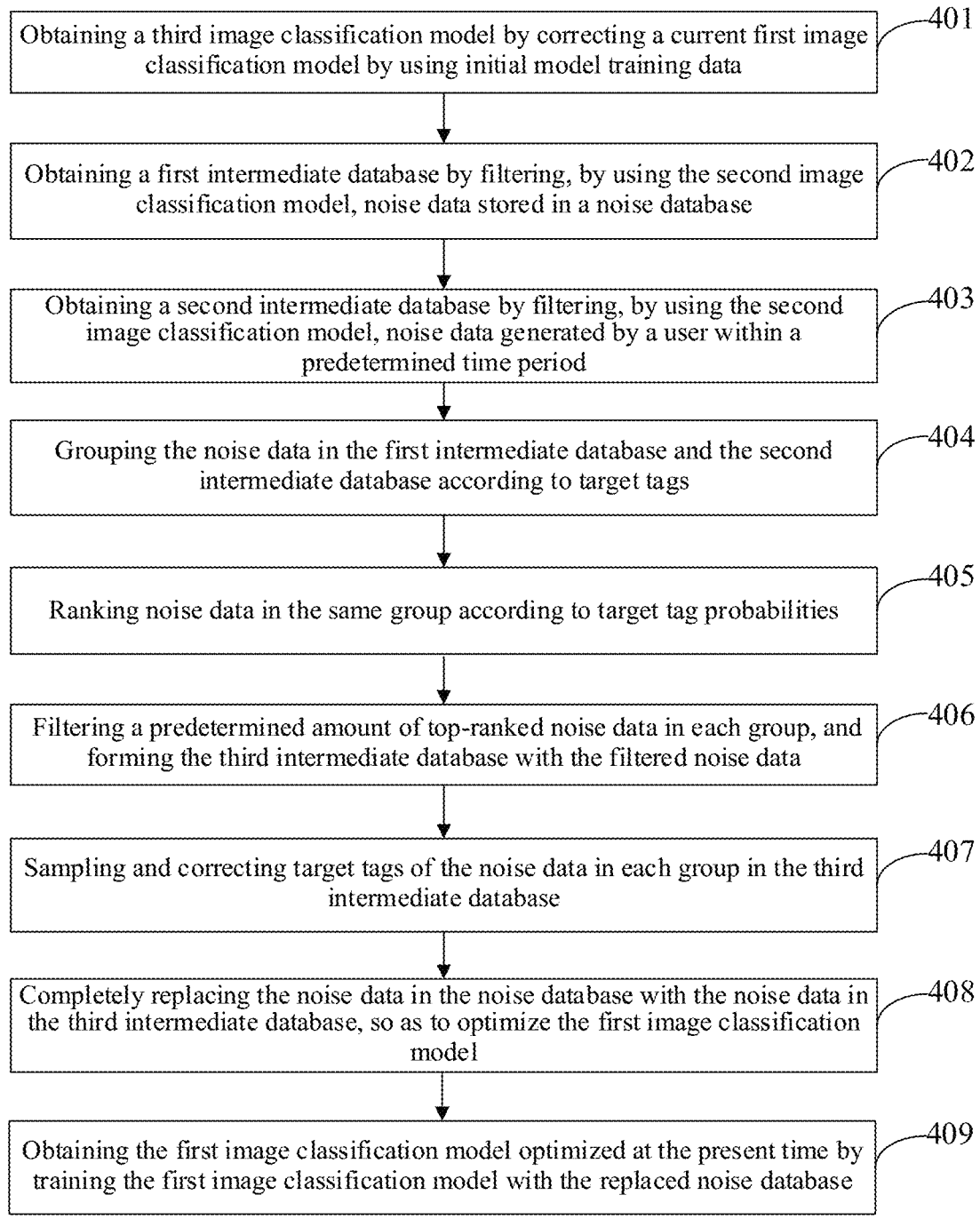
FIG. 4 is a flowchart of steps of a method for optimizing an image classification model according to an embodiment of the present disclosure.

Referring to FIG. 4, a flowchart of steps of a method for optimizing an image classification model according to an embodiment of the present disclosure is illustrated.

The method includes the following steps.

In step 401, a terminal obtains a third image classification model by correcting a current first image classification model by using initial model training data.

The first image classification model is obtained by training based on noise data stored in a noise database. The optimization on the first image classification model is substantially optimization of the noise database. Noise data that is historically generated by a user and is filtered is stored in the noise database. During specific implementation, the image classification model optimization is performed once every predetermined period to ensure the timeliness of the model optimization. In some embodiments, the predetermined period may be one day.

In step 402, the terminal obtains a first intermediate database by filtering, by using the second image classification model, noise data stored in a noise database.

The terminal may filter the noise data stored in the noise database in any feasible filter manner, which is not limited thereto in the embodiment of the present disclosure. The unclean noise data in the noise database may be removed by filtering. The unclean noise data is noise data having a low tag matching degree.

The low tag matching degree refers to that the tag matching value is lower than the predetermined matching threshold.

In step 403, the terminal obtains a second intermediate database by filtering, by using the second image classification model, noise data generated by a user within a predetermined time period.

It is to be noted that step 403 is not limited to be performed after step 402, and may be performed before step 402 or performed concurrently with step 402.

Step 401 is the same as step 301 in the above embodiment, step 402 is the same as step 302 in the above embodiment, and step 403 is the same as step 303 in the above embodiment.

In some embodiments, the terminal may filter the noise data generated by the user within the predetermined time period in any feasible manner, which is not limited in the embodiment of the present disclosure. In some embodiments, the specific process that the noise image generated by the user within the predetermined time period is filtered by using the second image classification model to obtain the second intermediate database includes the following substeps:

In sub-step 1, the terminal extracts a plurality of noise data from the noise data generated by the user within the predetermined time period as sample data.

The noise data generated by the user within the predetermined time period is data generated by operations of the user in the interval between two times of filtering. The amount of noise data extracted from the noise data generated by the user may be adjusted by those skilled in the art according to an actual demand. For example, tens of millions or hundreds of millions of noise data may be extracted as the sample data. The terminal may extract a plurality of noise data from the noise data generated by the user by random extraction, or by extraction according to a predetermined extraction strategy.

The predetermined extraction strategy is extracting according to a user identifier. The step that the terminal extracts a plurality of noise data from the noise data generated by the user within the predetermined time period as the sample data includes: with respect to each user who generates images within the predetermined time period, extracting a part of the noise data generated by the user according to the user identifier of the user, and taking a part of the noise data generated by each user as the sample data.

In sub-step 2, the terminal obtains transformed data of each of the sample data by transforming the each of the sample data.

In an embodiment, the sample data is an image. The process that the terminal obtains the transformed data of each of the sample data by transforming the each of the sample data is as follows: the terminal obtains a transformed image of each of sample images by transforming the each of the sample images according to a predetermined transformation mode. In some embodiments, the predetermined transformation mode may include at least one of: rotation, translation, and shearing. Upon the transformation of the sample images, each sample image corresponds to one or more transformed images.

In sub-step 3, the terminal determines a target tag and a target tag probability of the each of the sample data predicts by predicting a tag of each of the sample data and the transformed data by using the third image classification model; wherein the target probability of the sample data is a target probability that the sample data belongs to the target tag.

Further in sub-step 3, the terminal obtains a tag identification result of each data by predicting the tag of each of the sample data and the transformed data by using the third image classification model. The tag identification result includes: each tag corresponding to the data and a probability of each tag. Upon the tag identification on the third image classification model, each of the sample data corresponds to at least one tag; and then, the target tag and the target tag probability of each of the sample data may be determined by voting. The data includes: a plurality of operation data extracted from the noise data generated by the user within the predetermined time period, and transformed data corresponding to each of the plurality of operation data.

The tags corresponding to the data are predetermined tags in the third image classification model. The probability of each of the tags refers to a probability that the data belongs to the tag. In some embodiments, the step that the terminal respectively obtains the tag identification result of the data by predicting the tags of the sample data and the transformed data includes: obtaining a probability that the sample data belongs to each of the predetermined tags and a probability that the transformed data belongs to each of the predetermined tags by predicting the tags of the sample data and the transformed data, wherein each of the predetermined tags is a predetermined tag in the third image classification model.

When the terminal determines the target tag and the target tag probability of each of the sample data by voting, for each tag of each sample data, probabilities of the tag corresponding to the sample data and the transformed data of the sample data are subjected to weighted averaging to obtain a weighted average probability of the tag; a weighted average probability with the maximum value in weighted average probabilities of the tags is determined as a maximum weighted average probability; a tag corresponding to the maximum weighted average probability is determined as the target tag of the sample data; and the maximum weighted average probability is determined as the target tag probability of the sample data.

In some embodiments, the terminal determines, based on the probability that the sample data belongs to each of the predetermined tags and the probability that the transformed data belongs to each of the predetermined tags, a target probability that the sample data belongs to each of the predetermined tags; and selects a target tag with a maximum target probability from the predetermined tags based on the target probabilities that the sample data belongs to the predetermined tags, and determines the target probability that the sample data belongs to the target tag.

In sub-step 4, the terminal obtains the second intermediate database by filtering each of the sample data according to the target tag and the target tag probability of the each of the sample data.

Specifically, each sample data is grouped according to the target tag; sample data in the same group is ranked according to the target tag probabilities; and bottom-ranked sample data behind a predetermined rank place in each group is removed to obtain the second intermediate database.

Each group corresponds to one target tag, and the target tag of the top-ranked sample data has a large probability value. The predetermined digit may be set by those skilled in the art according to an actual demand, which is not specifically limited thereto in the embodiment of the present disclosure. The step is to rank the target tag probability of each sample data in the same group. Topk sample data is filtered from each group to form the second intermediate database. The sample data in the second intermediate database is also the noise data. The k is a positive integer.

Upon the determination of the first intermediate database and the second intermediate database, the first intermediate database and the second intermediate database need to be combined according to a predetermined rule to obtain a third intermediate database; and noise data in the third intermediate database is used to replace all noise data in the current noise database to optimize the noise database, thereby optimizing the first image classification model.

In some embodiments, the terminal replaces all the noise data in the current noise database with the noise data in the third intermediate database; or the terminal replaces a part of the noise data in the current noise database with the noise data in the third intermediate database. In the embodiment of the present disclosure, description is given using the case where the terminal replaces all the noise data in the current noise database with the noise data in the third intermediate database as an example.

It should be noted that in sub-steps 2 to 4, the target tags and the target probabilities of the sample data are predicted by virtue of the transformed data of the sample data; and the target tags and the target probabilities of the sample data may also be predicted in other ways. For example, the terminal directly predicts the target tags and the target probabilities of the sample data based on the sample data, and obtains the second data set by filtering the sample data. In some embodiments, sub-steps 2 to 4 may be as follows:

The terminal predicts the tags of the sample data by using the third image classification model, determines the target tags of the sample data and the target probabilities that the sample data belongs to respective tags thereof, and obtains the second intermediate database by filtering the sample data according to the target tags and the target probabilities of the sample data.

The terminal directly inputs the sample data into the third image classification mode, and outputs the probabilities that the sample data belongs to a plurality of predetermined tags; and determines a tag with a maximum probability as the target tag of the sample data according to the probabilities that the sample data belongs to each of the predetermined tags, and determines the probability that the sample data belongs to the target tag as the target probability.

In step 404, the terminal groups the noise data in the first intermediate database and the second intermediate database according to target tags.

In this step, the noise data in the two intermediate databases are grouped and integrated according to the target tags to which the noise data belongs, and the noise data belonging to the same target tag are placed into one group.

In step 405, the terminal ranks noise data in the same group according to target tag probabilities.

In response to ranking the noise data in the same group by the terminal according to a descending order of the target probabilities, the top-ranked noise data has a large target tag probability.

In some embodiments, in response to ranking the images in the same group by the terminal according to a descending order of the target probabilities, the top-ranked image has a smaller probability.

In step 406, the terminal filters a predetermined amount of top-ranked noise data in each group, and forms the third intermediate database with the filtered noise data.

The third intermediate database is a third data set constituted by the predetermined amount of noise data selected from each group. The predetermined number may be set by those skilled in the art according to an actual demand, which is not specifically limited thereto in the embodiment of the present disclosure.

In some embodiments, in addition to ranking the noise data in the same group according to the descending order of the target tag probabilities, the terminal may also rank the noise data in the same group in other ways. For example, the terminal may rank the noise data in the same group according to an ascending order of the target tag probabilities, and the terminal obtains a predetermined amount of bottom-ranked noise data in each group by filtering, and forms the third intermediate database with the obtained noise data.

In some embodiment, in addition to forming the third intermediate database with the predetermined amount of noise data with the maximum target probability in the same group, the terminal may also form the third intermediate database in other ways. For example, with respect to a plurality of noise data in the same group, the terminal selects noise with the target tag probability exceeding a predetermined probability according to the target tag probability of each of the noise data in the group of noise data, and forms the third intermediate database with the noise data selected from all the groups of noise data.

In some embodiments, in addition to ranking the noise data in the same group according to the target tag probabilities, and selecting the noise data, the terminal may also rank the noise data in the same group in other ways. For example, the terminal selects a predetermined amount of noise data from a plurality of noise data in the same group, and for any unselected noise data, determines whether the target tag probability of this noise data is greater than the target tag probability of any of the selected noise data; in response to determining that the target tag probability of the unselected noise data is greater than the target tag probability of the any of the selected noise data, the terminal replaces the unselected noise data with the any of the selected noise data, traverses the unselected noise data in sequence until all the unselected data noise is traversed, finally obtains a predetermined amount of noise data with the maximum target tag probability, and forming the third intermediate database with the obtained predetermined amount of noise data with the maximum target tag probability.

In step 407, the terminal samples and corrects target tags of the noise data in each group in the third intermediate database.

The terminal samples and corrects the target tags of the noise data in one group in the third intermediate database 1 in the following way.

The terminal samples the noise data from the group, and determines whether a target tag corresponding to the sampled noise data is accurate; if the target tag is not accurate, the target tag of the sampled noise data is corrected; and if the target tag is accurate, the target tag of the sampled noise data is not corrected.

When the target tag of the sampled noise data is corrected, the target tag of the noise data may be manually annotated. During specific implementation, top-ranked Topk noise data may be respectively sampled from each group for target tag correction, and the unsampled noise data is discarded.

The step that the terminal respectively samples and corrects the target tags of the noise data in each group in the third intermediate database includes: sampling noise data from the noise data from the group, and acquiring a manually annotated tag of the noise data; in response to determining that the manually annotated tag of the noise data is different from the target tag to which the sampled noise data belongs, correcting the target tag of the sampled noise data to the manually annotated tag.

In step 408, the terminal completely replaces the noise data in the noise database with the noise data in the third intermediate database, so as to optimize the first image classification model.

This step is similar to step 205, which is not described herein any further.

In step 409, the terminal obtains the first image classification model optimized at the present time by training the first image classification model with the replaced noise database.

This step is similar to step 206, which is not described herein any further.

The terminal optimizes the first image classification model by steps 401 to 409 at intervals of a predetermined period. When the terminal optimizes the first image classification model again after one predetermined period, the process goes back to step 401 to take the first image classification model optimized at the previous time as the current first image classification model, and the noise database optimized and replaced at the previous time as the current noise database.

During training of the first image classification model by the terminal with the replaced noise database, the first image classification model is the above current first image classification model Besides the beneficial effects of the method for optimizing the image classification model shown in the above embodiment, the method for optimizing the image classification model in the embodiment of the present disclosure samples top-ranked Topk noise data from each group for target tag correction when combining the first intermediate database and the second intermediate database, and thus can improve the accuracy of the target tag of the noise data in the noise database.

Figure 5:
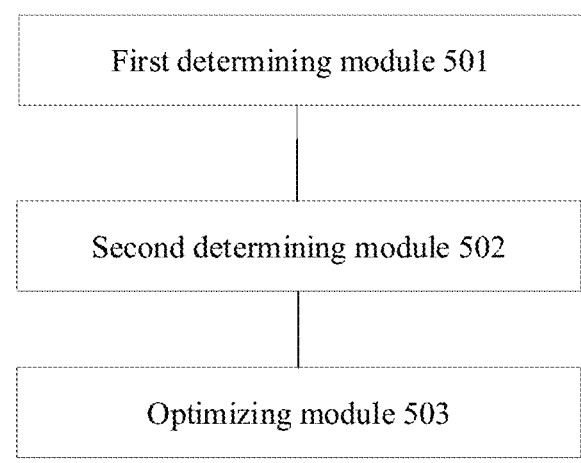
FIG. 5 is a structural block diagram of a system for optimizing an image classification model according to an embodiment of the present disclosure.

Referring to FIG. 5, a structural block diagram of a system for optimizing an image classification model according to an embodiment of the present disclosure is illustrated.

The system includes: a processor; wherein the processor is configured to implement functions of a first determining module 501, a second determining module 502, and an optimizing module 503.

The first determining module 501 is configured to determine a first image classification model based on initial training data, wherein the initial training data includes at least one image with a manually annotated tag.

The second determining module 502 is configured to in response to model optimization, determine a second image classification model based on the first image classification model and a noise data set, wherein the noise data set includes a plurality of noise data.

The optimizing module 503 is configured to obtain a third image classification model by optimizing the second image classification model based on the initial training data, wherein the third image classification model is configured to update the noise data set based on noise data generated within a predetermined time period and the noise data set, the predetermined time period including a time period between two adjacent model optimizations.

In some embodiments, the processor is further configured to implement the functions of a first filtering module, a second filtering module, a combining module, and a replacing module.

The first filtering module is configured to obtain a first data set by filtering noise data stored in the noise data set.

The second filtering module is configured to obtain a second data set by filtering, by using the third image classification model, the noise data generated within the predetermined time period.

The combining module is configured to obtain a third data set by combining the first data set and the second data set.

The replacing module is configured to replace the noise data in the noise data set with noise data in the third data set.

In some embodiments, the second filtering module includes:

an extracting unit, configured to extract a plurality of noise data from the noise data generated by the user within the predetermined time period as sample data;

a predicting unit, configured to determine a target tag of each of the sample data and a target tag probability that the each of the sample data belongs to the tag thereof by predicting a tag of the each of the sample data by using the third image classification model; and a filtering unit, configured to obtain the second data set by filtering the each of the sample data according to the target tag and the target tag probability of the each of the sample data.

In some embodiments, the predicting unit includes:

a transforming sub-unit, configured to obtain transformed data of the sample data by transforming the sample data;

a predicting sub-unit, configured to obtain a probability that the sample data belongs to each of predetermined tags and a probability that the transformed data belongs to the each of the predetermined tags by predicting tags of the sample data and the transformed data by using the third image classification model, the each of the predetermined tags being a predetermined tag in the third image classification model;

a determining sub-unit, configured to determine, based on the probability that the sample data belongs to the each of the predetermined tags and the probability that the transformed data belongs to the each of the predetermined tags, a target probability that the sample data belongs to the each of the predetermined tags; and a selecting sub-unit, configured to select a target tag with a maximum target probability from the predetermined tags based on the target probability that the sample data belongs to the each of the predetermined tags, and determine a target probability that the sample data belongs to the target tag.

In some embodiments, the transforming sub-unit is configured to obtain the transformed data of the each of the sample data by transforming the each of the sample data according to a predetermined transformation mode, wherein the predetermined transformation mode includes at least one of: rotation, translation, and shearing.

In some embodiments, each of the noise data in the first data set is annotated with a target tag thereof and a target probability that the each of the noise data belongs to a tag thereof; and the processor is further configured to implement the function of a combining module.

The combining module is configured to group the noise data in the first data set and the second data set according to target tags; and form the third data set using a predetermined quantity of noise data having a maximum target probability in a same group.

In some embodiments, the processor is further configured to implement the function of a correcting module.

The correcting module is configured to sample and correct the target tags of the noise data in the groups in the third data set.

In some embodiments, the correcting module is configured to extract the noise data from each of the groups, and acquire a manually annotated tag of the extracted noise data; and correct the target tag of the extracted noise data to the manually annotated tag in response to determining that the manually annotated tag of the extracted noise data is different from the target tag to which the extracted noise data belongs.

In some embodiments, the first filtering module is configured to extract a plurality of noise data from the noise data set as sampling data; obtain transformed data of each of the sampling data by transforming the each of the sample data; add the transformed data of the each of the sampling data to the noise data set; and obtain the first data set by filtering the noise data set to which the transformed data is added.

In the system according to the embodiment of the present disclosure, the system determines a first image classification model based on initial training data, determines a second image classification model on noise data in a noise database and the first image classification model, and obtains a third image classification model by correcting (optimizing) the second image classification model based on the initial training data, filters, by using the third image classification model, the noise data in the noise database and noise data generated during two model optimizations, combines the filtered noise data, and replaces the noise data in the noise database with the combined noise data, thereby expanding the noise data database along with the media data generated in Internet, and optimizing the image classification model. In the terminal according to the embodiments of the present disclosure, the tagging of the user on massive training data turns out to be unnecessary, and only the first image classification model obtained by training with the initial training data is tagged manually; and in use, the first image classification model can be automatically optimized. Accordingly, the manpower resource can be saved, the timeliness for optimizing the image classification model can be ensured, and the decline in prediction ability of the image classification model is avoided.

It should be noted that for the system embodiment, the description is relatively simple because of its substantial similarity to the method embodiments, and the related parts may refer to the description of the method embodiments.

Corresponding to the above method embodiment, an embodiment of the present disclosure provides a computer program product. When running on a computer, the computer program product enables the computer to perform the steps of any method for optimizing the image classification model in the present disclosure.

In the computer program product according to the embodiment of the present disclosure, the processor determines a first image classification model based on initial training data, determines a second image classification model on noise data in a noise database and the first image classification model, and obtains a third image classification model by correcting (optimizing) the second image classification model based on the initial training data, filters, by using the third image classification model, the noise data in the noise database and noise data generated during two model optimizations, combines the filtered noise data, and replaces the noise data in the noise database with the combined noise data, thereby expanding the noise data database along with the media data generated in Internet, and optimizing the image classification model. In the terminal according to the embodiments of the present disclosure, the tagging of the user on massive training data turns out to be unnecessary, and only the first image classification model obtained by training with the initial training data is tagged manually; and in use, the first image classification model can be automatically optimized. Accordingly, the manpower resource can be saved, the timeliness for optimizing the image classification model can be ensured, and the decline in prediction ability of the image classification model is avoided.

The image classification model optimization solutions are not inherently correlated with any particular computer, virtual system or other devices. Various universal systems may also be used together based on the demonstrations herein. According to the above description, the structure required to construct the system having the solutions of the present disclosure is apparent. Additionally, the present disclosure is also not dedicated to any particular programming language. It should be understood that various programming languages may be used to implement the contents of the present disclosure described herein, and the above description on the specific language is to disclose the optional embodiments of the present disclosure.

The description as provided here describes a lot of specific details. However, it can be appreciated that the embodiments of the present disclosure may be implemented in the absence of these specific details. In some examples, well known methods, structures and technologies have not been described in detail as not to obscure understanding of the description.

Similarly, it should be appreciated that in the description of example embodiments of the present disclosure, various features of the present disclosure are sometimes grouped together in a single embodiment, figure, or description thereof for the purpose of streamlining the present disclosure and aiding in the understanding of one or more of the various aspects of the present disclosure. The method of present disclosure, however, is not to be interpreted as reflecting an intention that the claimed disclosure requires more features than are expressly recited in each claim. More exactly, as the following claims reflect, the aspects of the present disclosure lie in less than all features of a single foregoing disclosed embodiment. Thus, the claims following the detailed description are hereby expressly incorporated into the detailed description, with each claim standing on its own as a separate embodiment of the present disclosure.

Those skilled in the art may understand that the modules in the device in the embodiment may be adaptively changed and set in one or more devices different from the present embodiment. The modules or units or components in the embodiments may be combined into one module or unit or assembly, and furthermore, these may be divided into a plurality of sub-modules or subunits or sub-assemblies. Except that at least some of such features and/or processes or units are mutually exclusive, all features disclosed in this specification (including the accompanying claims, abstract, and drawings) and all processes or units of any method or device so disclosed may be combined in any combination. Each feature disclosed in this specification (including the accompanying claims, abstract, and drawings) may be replaced by alternative features serving the same, equivalent or similar purpose, unless expressly stated otherwise.

Furthermore, while some embodiments described herein include some but not other features included in other embodiments, combinations of features of different embodiments are meant to be within the scope of the present disclosure, and form different embodiments, as would be understood by those in the art. For example, in the claims, any of the claimed embodiments may be used in any combination manner.

Various component embodiments of the present disclosure may be implemented by hardware, or implemented by one or more software modules running on the processor, or implemented by a combination thereof. Those skilled in the art should understand that a microprocessor or digital signal processor (DSP) may be used in practice to implement some or all functions of some or all components in the image classification model optimization solutions according to the embodiments of the present disclosure. The present disclosure may also be implemented as a device or system program (e.g., computer program and computer program product) for executing part or all methods described here. Such programs implementing the present disclosure may be stored in a computer-readable medium, or may be in a form having one or more signals. Such signals can be obtained by downloading from the Internet website, or provided on a carrier signal, or provided in any other form.

The system for optimizing the image classification model in the embodiment of the present disclosure is configured to perform the corresponding methods for optimizing the image classification model in the method embodiments, and achieves the corresponding beneficial effects with the method embodiments, which are not elaborated herein.

It should be noted that the above embodiments illustrate the present disclosure but are not intended to limit the present disclosure, and those skilled in the art may design alternative embodiments without departing from the scope of the appended claims. In claims, any reference signs placed in parentheses should not be construed as limiting the claims. The words "include", "comprise", and derivatives thereof do not exclude the presence of elements or steps not listed in a claim. The word "a" or "an" preceding an element does not exclude the presence of a plurality of such elements. The present disclosure may be implemented by virtue of hardware including several different elements and by virtue of a properly-programmed computer. In the system claims enumerating several units, several of these units can be embodied by one and the same item of hardware. The usage of the words first, second and third, et cetera, does not indicate any ordering. These words are to be interpreted as names.

What is claimed is:

1. A method for optimizing an image classification model, comprising:
    determining a first image classification model based on initial training data, wherein the initial training data comprises at least one image with a manually annotated tag;
    determining a second image classification model based on the first image classification model and a noise data set, wherein the noise data set comprises a plurality of noise data;
    obtaining a third image classification model by optimizing the second image classification model based on the initial training data, the third image classification model being configured to update the noise data set based on noise data generated within a predetermined time period and the noise data set, wherein the predetermined time period comprises a time period between two adjacent model optimizations.

2. The method according to claim 1, wherein the third image classification model being configured to update the noise data set comprising:
    obtaining a first data set by filtering noise data stored in the noise data set;
    obtaining a second data set by filtering, by using the third image classification model, the noise data generated within the predetermined time period;
    obtaining a third data set by combining the first data set and the second data set;
    replacing the noise data in the noise data set with noise data in the third data set.

3. The method according to claim 2, wherein obtaining the second data set comprising:
    extracting a plurality of noise data from the noise data generated by the user within the predetermined time period as sample data;
    determining a target tag of each of the sample data and a target tag probability that the each of the sample data belongs to the tag thereof by predicting a tag of the each of the sample data by using the third image classification model; and
    obtaining the second data set by filtering the each of the sample data according to the target tag and the target tag probability of the each of the sample data.

4. The method according to claim 3, wherein determining the target tag of each of the sample data and the target tag probability comprising:
    obtaining transformed data of the sample data;
    determining a first probability that the sample data belongs to each of predetermined tags and a second probability that the transformed data belongs to the each of the predetermined tags, wherein the each of the predetermined tags is a predetermined tag in the third image classification model;
    determining target probabilities that the sample data belongs to the each of the predetermined tags based on the first probability and the second probability; and
    determining a target tag based on the target probability with a maximum probability, and the target tag probability that the sample data belongs to the target tag.

5. The method according to claim 4, wherein obtaining transformed data of the each of the sample data comprising:
    obtaining the transformed data by transforming the sample data based on a predetermined transformation mode, wherein the predetermined transformation mode comprises at least one of:
    rotation, translation, and shearing.

6. The method according to claim 2, wherein the each of the noise data in the first data set is annotated with a target tag thereof and a target probability that the each of the noise data belongs to a tag thereof; and
    wherein obtaining the third data set by combining, according to the predetermined rule, the first data set and the second data set comprises:
    grouping the noise data in the first data set and the second data set according to target tags; and
    forming the third data set using a predetermined quantity of noise data having a maximum target probability in a same group.

7. The method according to claim 6, wherein after forming the third data set using the predetermined quantity of noise data having the maximum target probability in the same group, the method further comprises:
    sampling and correcting the target tags of the noise data in the groups in the third data set.

8. The method according to claim 7, wherein respectively performing the target tag sampling correction on the noise data in all groups in the third data set comprises:
    extracting the noise data from each of the groups, and acquiring a manually annotated tag of the extracted noise data; and
    correcting the target tag of the extracted noise data to the manually annotated tag in response to determining that the manually annotated tag of the extracted noise data is different from the target tag to which the extracted noise data belongs.

9. The method according to claim 2, wherein obtaining the first data set by filtering the noise data stored in the noise data set comprises:
    extracting a plurality of noise data from the noise data set as sample data;
    obtaining transformed data of each of the sample data by transforming the each of the sample data;
    adding the transformed data of the each of the sample data to the noise data set; and
    obtaining the first data set by filtering the noise data set to which the transformed data is added.

10. A terminal, comprising: a memory, a processor, and a computer program stored on the memory and runnable on the processor, wherein the computer program, when run by the processor, causes the processor to perform a method comprising:
    determining a first image classification model based on initial training data, the initial training data comprising at least one image with a manually annotated tag;
    in response to model optimization, determining a second image classification model based on the first image classification model and a noise data set, wherein the noise data set comprises a plurality of noise data; and
    obtaining a third image classification model by optimizing the second image classification model based on the initial training data, the third image classification model being configured to update the noise data set based on noise data generated within a predetermined time period and the noise data set, wherein the predetermined time period comprises a time period between two adjacent model optimizations.

11. The terminal according to claim 10, wherein the method further comprises:
    obtaining a first data set by filtering noise data stored in the noise data set, and obtaining a second data set by filtering, by using the third image classification model, the noise data generated within the predetermined time period;

obtaining a third data set by combining the first data set and the second data set; and replacing the noise data in the noise data set with noise data in the third data set.

12. The terminal according to claim 11, wherein the method further comprises:

extracting a plurality of noise data from the noise data generated by the user within the predetermined time period as sample data;

determining a target tag of each of the sample data and a target tag probability that the each of the sample data belongs to the tag thereof by predicting a tag of the each of the sample data by using the third image classification model; and obtaining the second data set by filtering the each of the sample data according to the target tag and the target tag probability of the each of the sample data.

13. The terminal according to claim 12, wherein the method further comprises:

obtaining transformed data of the sample data by transforming the sample data;

obtaining a probability that the sample data belongs to each of predetermined tags and a probability that the transformed data belongs to the each of the predetermined tags by predicting tags of the sample data and the transformed data by using the third image classification model, wherein the each of the predetermined tags is a predetermined tag in the third image classification model;

determining, based on the probability that the sample data belongs to the each of the predetermined tags and the probability that the transformed data belongs to the each of the predetermined tags, a target probability that the sample data belongs to the each of the predetermined tags; and selecting a target tag with a maximum target probability from the predetermined tags based on the target probability that the sample data belongs to the each of the predetermined tags, and determining a target probability that the sample data belongs to the target tag.

14. The terminal according to claim 13, wherein the method further comprises:

obtaining the transformed data of the each of the sample data by transforming the each of the sample data according to a predetermined transformation mode, wherein the predetermined transformation mode comprises at least one of: rotation, translation, and shearing.

15. The terminal according to claim 11, wherein the each of the noise data in the first data set is annotated with a target tag thereof and a target probability that the each of the noise data belongs to a tag thereof; and wherein the method further comprises: grouping the noise data in the first data set and the second data set according to target tags; and forming the third data set using a predetermined quantity of noise data having a maximum target probability in a same group.

16. The terminal according to claim 15, wherein the method further comprises:

sampling and correcting the target tags of the noise data in the groups in the third data set.

17. The terminal according to claim 16, wherein the method further comprises:

extracting the noise data from each of the groups, and acquiring a manually annotated tag of the extracted noise data; and correcting the target tag of the extracted noise data to the manually annotated tag in response to determining that the manually annotated tag of the extracted noise data is different from the target tag to which the extracted noise data belongs.

18. The terminal according to claim 11, wherein the method further comprises:

extracting a plurality of noise data from the noise data set as sample data;

obtaining transformed data of each of the sample data by transforming the each of the sample data;

adding the transformed data of the each of the sample data to the noise data set; and obtaining the first data set by filtering the noise data set to which the transformed data is added.

19. A non-transitory computer-readable storage medium storing a computer program thereon, wherein the computer program, when run by a processor, causes the processor to perform a method comprising:

determining a first image classification model based on initial training data, the initial training data comprising at least one image with a manually annotated tag;

in response to model optimization, determining a second image classification model based on the first image classification model and a noise data set, wherein the noise data set comprises a plurality of noise data;

obtaining a third image classification model by optimizing the second image classification model based on the initial training data, wherein the third image classification model is configured to update the noise data set based on noise data generated within a predetermined time period and the noise data set, wherein the predetermined time period comprises a time period between two adjacent model optimizations.

* * * * *